June 14, 1932.                S. SCHMID, JR                    1,863,504
                         ELECTRIC DRIVE TRACTOR
                          Filed June 23, 1931
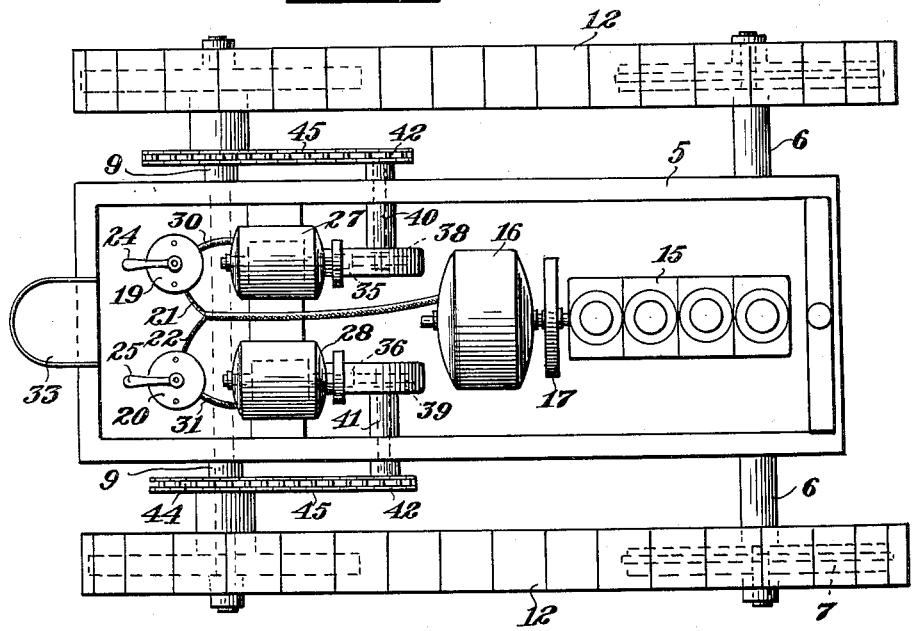
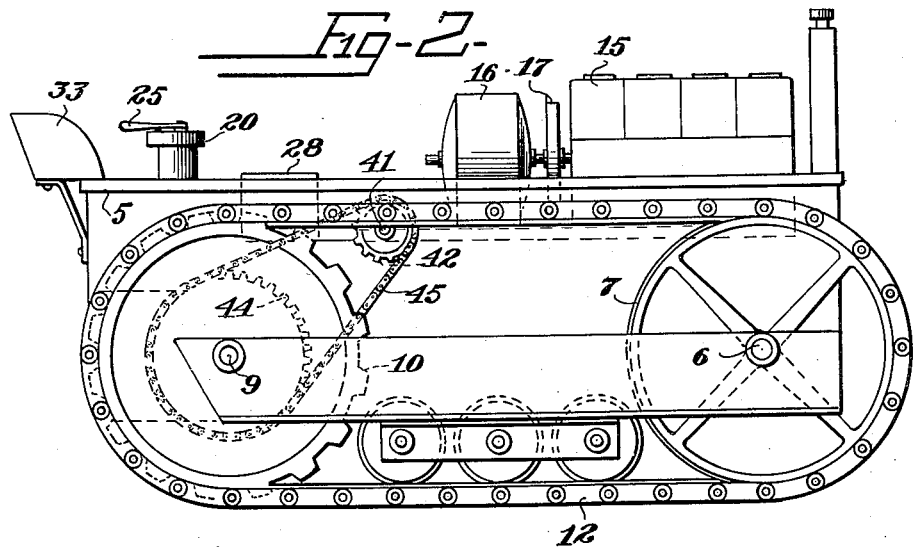
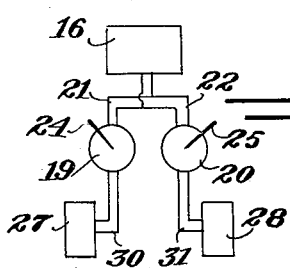
Stephen Schmid Jr.
INVENTOR
BY Victor J. Evans
ATTORNEY Patented June 14, 1932

1,863,504

UNITED STATES PATENT OFFICE

STEPHEN SCHMID, JR., OF JERSEY CITY, NEW JERSEY

ELECTRIC DRIVE TRACTOR

Application filed June 23, 1931. Serial No. 546,334.

This invention relates to electric drives for tractors and more especially for tractors of the chain tread type which travel on their own tracks.

An object of the invention is the provision of an electric drive for chain tread tractors especially in order to facilitate the steering and particularly the turning movements of such tractors.

Other objects will be appreciated by those skilled in the art upon reading the following specification.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claim.

In the drawing:

Fig. 1 is a plan view of a chain tread tractor embodying my invention.

Fig. 2 is a side elevation of the tractor shown in Fig. 1; and

Fig. 3 is a diagrammatic view of electrical apparatus employed in providing an electric drive for the tractor shown in Figs. 1 and 2.

Referring to the drawing for a more detailed description thereof, the numeral 5 indicates the frame of the tractor to which is mounted the front axle 6 carrying wheels 7. A pair of rear axles 9, which are independent and distinct from each other are also affixed to the frame and carry sprocket wheels 10. The usual tracks 12 are mounted on the wheels 7 and 10. An internal combustion engine 15, which is preferably of the Diesel type is carried by the frame and is adapted to operate an electric generator 16, a fly wheel 17 being interposed between the engine or motor 15 and the generator 16, it being understood that the fly wheel is no part of this invention but is a usual element. The generator 16 is electrically connected to a pair of motor controllers 19 and 20 by means of pairs of conductors 21 and 22, respectively. The motor controllers 19 and 20 are provided with operating levers 24 and 25, respectively, so that the speeds of electric motors 27 and 28 may be varied independently at will and so that the directions in which said motors turn may be varied at will and independently of each other if desired, it being understood that the two motors may be operated in opposite directions when desired as for example when the tractor is to be turned in a small space, said motors being respectively electrically connected to the controllers 19 and 20 by means of pairs of conductors 30 and 31. The controllers 19 and 20 are mounted on the frame adjacent the driver's seat 33. The motors 27 and 28 are respectively adapted to turn worm gears 35 and 36, and said worm gears are adapted to turn circular gears 38 and 39, respectively. The gears 38 and 39 are respectively mounted fixedly on shafts 40 and 41, these shafts carrying at their outer ends sprocket wheels 42. Sprocket wheels 42 are connected with larger sprocket wheels 44 by means of sprocket chains 45, the sprocket wheels 44 being fixedly mounted on the sprocket wheels 10.

From the foregoing description it will be readily understood that I have provided means for driving each of the rear sprocket wheels 10 independently, whereby the steering of tractors of the chain tread type is facilitated, enabling the driver to turn the tractor more readily and in a smaller space, it being understood that when it is desired to turn the tractor the motor on the turning side is slowed down, or, if necessary, shut off. It will also be realized from the foregoing description that one of the rear sprocket wheels 10 may be turned in one direction while the other sprocket wheel 10 in turned in the opposite direction, whereby the tractor may be turned around in a comparatively very small space.

What is claimed as new is:

In a tractor of the chain tread type having a driving wheel on each side, a second wheel on each side spaced from the driving wheel and chain treads trained over the driving wheels and second wheels, a pair of motors mounted on the tractor, a pair of aligned shafts mounted on the tractor and projecting laterally from opposite sides thereof, drive chains operatively connecting the driving wheels with said shafts, worm wheels mounted on the inner ends of said shafts, worms carried one each by each of said motors and in mesh with said worm gears, a power supply mounted on the tractor and common to both motors, an operator's seat positioned on the tractor adjacent the rear thereof, and an independent control for each motor, the two controls being positioned adjacent to but on opposite sides of the operator's seat for selective actuation to effect relative changes in speed of the driving wheels and thereby effect diversion of the tractor from a straight course.

In testimony whereof I hereby affix my signature.

STEPHEN SCHMID, Jr.